United States Patent [19]
McCallen

[11] 3,839,905
[45] Oct. 8, 1974

[54] SHEAR TESTING TOOL
[75] Inventor: James A. McCallen, Eugene, Oreg.
[73] Assignee: Bohemia Lumber Company Incorporated, Eugene, Oreg.
[22] Filed: Feb. 25, 1972
[21] Appl. No.: 229,376

[52] U.S. Cl. .................................................. 73/101
[51] Int. Cl. .............................................. G01n 3/24
[58] Field of Search............. 73/101, 99; 192/167 R

[56] References Cited
UNITED STATES PATENTS
1,760,033  5/1930  Amsler................................... 73/99

Primary Examiner—Jerry W. Myracle
Attorney, Agent, or Firm—Seed, Berry, Vernon & Baynham

[57] ABSTRACT

A shear testing tool for specimens of particle board, plywood or the like wherein a specimen of a predetermined standard size is placed such that it bridges the interface of a pair of relatively rotatable contiguous members and sufficient pressure is applied to one member to cause the bond to break. This tool utilizes the destructive torque pressure to determine the tensile strength of the specimen in a direction perpendicular to the surface by means of a correlation factor.

9 Claims, 3 Drawing Figures

PATENTED OCT 8 1974　　　　　　　　　　　　　　3,839,905

SHEAR TESTING TOOL

BACKGROUND OF THE INVENTION

The test for tensile strength perpendicular to the surface of fiberboards or the like is made upon specimens in the dry condition to determine cohesion of the fiberboard in the direction perpendicular to the plane of the board. The test specimen is a standard 5 centimeters or 2 inches square and the thickness is that of the finished board. Loading blocks of steel or aluminum alloy are bonded with adhesive to the square faces of the specimen and loading fixtures which are in the shape of a pair of opposed C's are then placed in engagement with the blocks attached to the specimens and the specimens stressed by separation of the heads of the testing machine until failure occurs. The direction of loading is as nearly perpendicular as the face of the fiberboard as possible and the center of the load shall pass through the center of the specimen. The load is applied continuously throughout the test at a uniform rate of motion of the testing machine of 0.08 inches per inch of thickness permitted.

The use of torque shear testing method for testing the tensile strength would reduce the testing time by approximately 75 percent which in many laboratories would amount to several hours a day. A torque shear tool is used incorporating a torque correlation and applies a torque or twisting action to the test specimen. The torque may be applied by a regular testing machine or a torque wrench. The inch pound reading obtained by a torque wrench or the foot pound reading obtained by the standard testing machine is then correlated to a conventional test such that the results are in psi.

Torque testing machines of which the applicant is aware includes the one described in U.S. Pat. No. 233,712 granted to Thurston on Oct. 26, 1880 which measures the resistance to twisting of a specimen but not the force needed for shear along a given plane. Another prior art torsion testing machine is that described in U.S. Pat. No. 1,829,969 granted to Smith on Nov. 3, 1931 for assisting in post mortem examinations on the study of physiology and pathology of joint motion as related to bodily stresses prior to death. Another prior art device is described in U.S. Pat. No. 2,454,850 granted to Van Winkle et al. on Nov. 3, 1948 which is very similar in concept to the one described in the Thurston patent. Yet another testing mechanism is shown in U.S. Pat. No. 2,666,324 granted to Scott on Jan. 19, 1954 which includes an elaborate means, including universal joints, for testing the amount of any given pressure necessary to cause a twisting of the specimen.

It is to be noted that none of the devices known to the present inventor nor shown in the above noted patent grants include a means for testing the shear strength of a specimen of particle board or the like. Nor are any of these devices adapted to measure the amount of torque necessary to cause a specimen to facture along a given plane, thus testing the bonding strength between the various particles within the test specimen.

With the above noted prior art and problems in mind it is an object of the present invention to provide a mechanism whereby the shear strength of a test specimen may be determined by applying torque to the specimen and measuring the amount of pressure necessary to cause the specimen to shear. This process measures the particle adhesion within the specimen and thus the shear strength.

Another object of the present invention is to provide a mechanism for testing the shear strength of a test specimen which may be operated by a standard hydraulic or mechanical tester or alternatively by a hand operated torque wrench.

Yet another object of the present invention is to provide a shear testing machine for particle board or the like wherein the specimen may be quickly and easily placed within the machine for testing and removed therefrom following the destructive test.

DETAILED DESCRIPTION OF THE DRAWINGS

Figure 1:
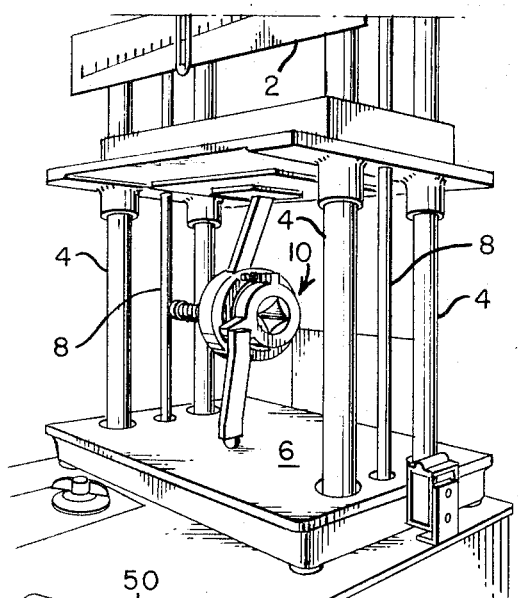
FIG. 1 is an environmental view of the torque shear test mechanism as installed in a pressure testing mechanism.

As seen in FIG. 1 the torque testing mechanism is shown mounted within a testing machine such as that produced by Testing Machines, Inc. under the Model No. TM 51008 and which includes a scale 2 vertical guides 4, a scale platform 6 and worms 8 for applying pressure to the shear test device 10.

Figure 2:
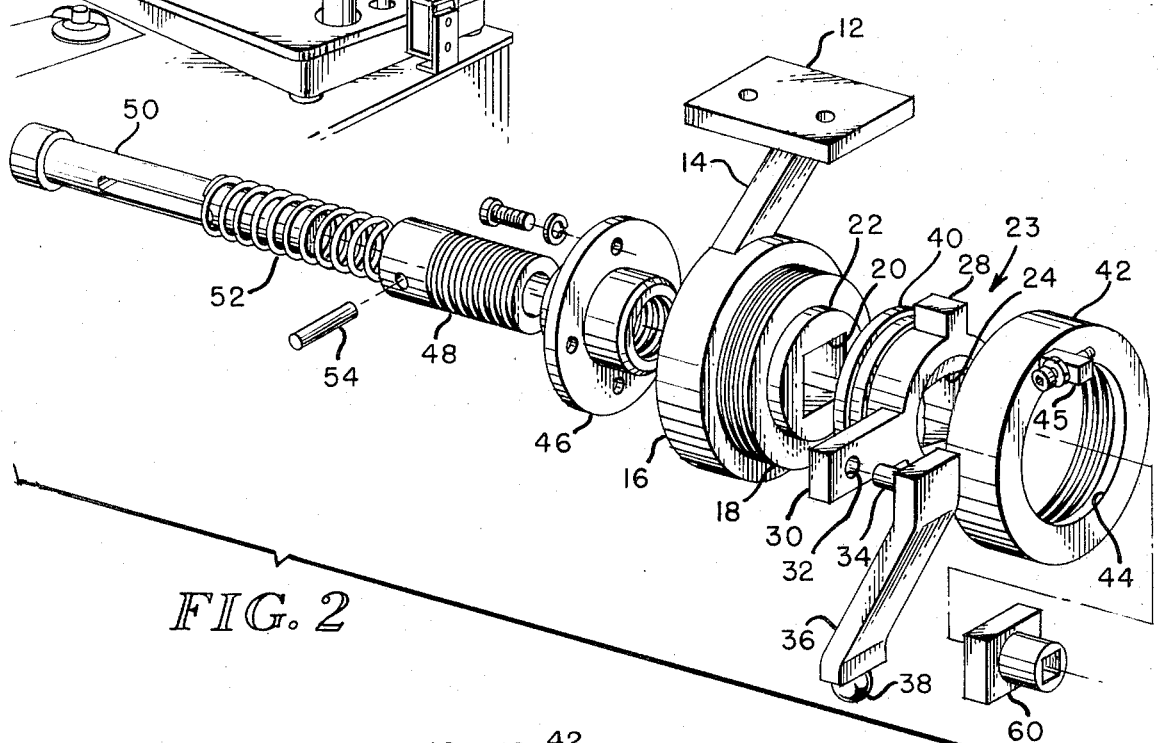
FIG. 2 is an exploded view of the shear testing mechanism.
Figure 3:
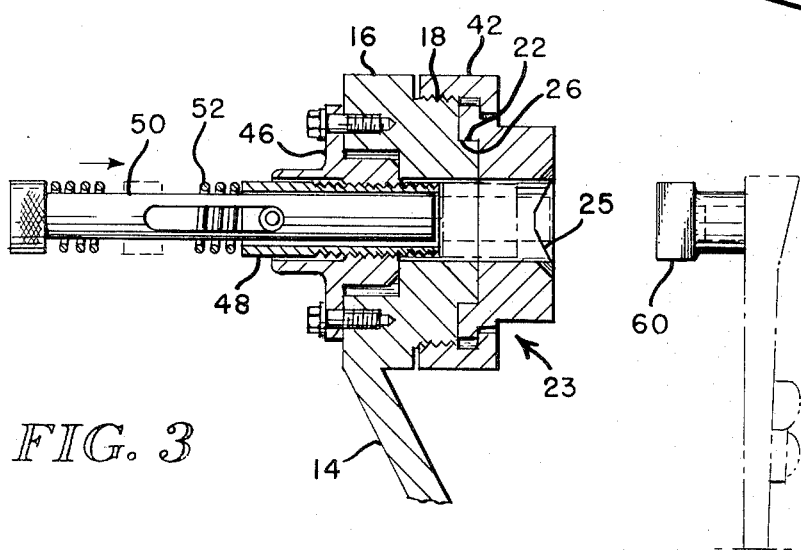
FIG. 3 is a sectional view through the shear testing mechanism wherein the method for applying pressure comprises a torque wrench.

Referring now to FIGS. 2 and 3 it can be seen that the shear testing tool itself includes a mounting plate 12 which has a flat outwardly facing surface such that it may be easily attached either to a bench surface or alternatively to a pressure applying surface of a testing device as shown in FIG. 1. The mounting plate is rigidly connected to an arm 14 which in turn is attached to the main body portion 16. The main body portion includes a generally cylindrical exterior and a threaded cylindrical protrustion 18 at one end with a cylindrical bore 19 at the opposite end. A square bore 20 is located in one end of the threaded end and as described hereinafter, the square bore 20 is adapted to receive the sample and serves as the stationary torque block during testing. It is to be noted that the end surface immediately surrounding the square bore 20 slightly protrudes from the face of the threaded portion 18 and has a cylindrical exterior surface 22 adapted to serve as a guide as explained hereinafter.

The movable torque block 23 includes a square bore 24 extending therethrough and having tapered edges 25. Movable torque block 23 includes a bore 26, see FIG. 3, adapted to axially receive the cylindrical surface 22 such that the centers of the square bores 20 and 24 are properly aligned. The square bore 24 is centrally located within the generally cylindrical torque block 23 which further includes an upstanding block 28 upon its exterior surface for purposes to be hereinafter described. Torque block 23 also includes an outwardly extending torque lever 30 upon its exterior surface for use with a testing machine as in FIG. 1.

A bore 32 is located at the outer end of the lever 30 and will normally include bearings therein to rotatably receive a cylindrical extension 34 from a pressure transfer arm 36. As seen in FIG. 1 the pressure transfer arm 36 is adapted to rest upon the bottom or scale platform 6 of the torque testing machine and includes a spherical bearing surface 38 located at its outermost end to permit a rolling, relatively frictionless movement during the testing.

The movable torque block 23 further includes an outwardly extending ledge or rim 40 at the end adapted to abut main body portion 16 when assembled. Ledge 40 is adapted to interact with a retaining ring 42 which is internally threaded to mate with the threaded portion 18 and has an inwardly extending lip 44 such that when it is in assembled condition, as shown in FIG. 3, the retaining ring 42 holds the movable torque block 23 in position adjacent the main body portion 16. The degree to which the retaining ring 42 is tightened determines the amount of spacing between the main body portion 16 and the movable ring 26 and it is preferable that they be contiguous without excessive frictional drag. Extending outwardly from the face of the lip 4 of retaining ring 42 is an alignment assembly 45 which includes a block fixedly secured to the retaining ring and a threaded element extending through the block and adapted to contact the extension 28 upon the movable torque block when the tool is assembled. The threaded element in the alignment assembly 45 is used to assure that the sides of two square bores 20 and 24 are in alignment when the test pressure is released allowing easy insert or exit of the sample block.

Secured to the main body portion 16 on the side opposite to that heretofore described to the left as seen in the Figures is a specimen centering sleeve 46 adapted to be fixedly secured to the main body portion by bolts or the like. The sleeve is internally threaded to receive an adjustable specimen stop rod 48. The stop rod 48 is threaded into or out of the sleeve 46 and extends into the aft portion of bore 20 to properly limit the extent that the specimen will travel when placed in the test chamber formed by bores 20 and 24. The specimen will be placed during test such that the interface between the fixed and movable torque blocks lies at the central plane of the specimen.

Stop rod 48 is hollow and has slidably mounted therein an ejector 50. Ejector 50 is of sufficient length and so mounted that its internal end 51 may be forced through the sleeves and torque blocks and push the specimen from within the chamber. The ejector 40 is returned to its non-eject position by means of compression spring 52 which automatically returns the ejector to a position whereat the end 51 is completely inside the stop rod 48 so the stop rod presents a stable surface once it is adjusted. Ejector 50 is prevented from accidentally being removed from the tool by means of the holding pin 54 which extends through centering sleeve 48 and passes through slot 56 in the ejector.

In operation the specimen will be placed within the chamber by hand and the proper torque applied to cause shear. The torque will be recorded and the specimen pieces quickly removed by a simple pushing action upon the ejector. Also seen in FIGS. 2 and 3 is a torque wrench adaptor 60 which fits within the square bore 24 and has a fitting which it mates with a standard torque wrench as seen in FIG. 3.

In summary the placement of the specimen, the actual test and the removal of the sheared specimen all take far less time than heretofore. The test results are the equivalent of those reached in the presently used test so there is no sacrifice of reliability but a substantial increase in the number of specimens which may be tested in a given time.

The embodiments of the invention in which a particular property or privilege is desired are defined as follows:

1. A tool for use in determining the shear strength of a specimen of particle board or the like comprising;
    a first, relatively fixed main body portion including means to secure this portion to a stable surface and a flat sided bore adapted to receive the specimen,
    a second body portion having a bore identical to the bore in the first body portion and adapted to be secured to the first body portion with the bores in axial alignment, said two body portions having contiguous surfaces adjacent the bores and secured to allow relative rotation about the axis of the bores, and
    means to secure the two body portions in abutting relationship whereby a specimen may be placed in the tool bridging the interface between the two body portions, and means upon the second body portion to receive torque and stress the specimen placed within the tool whereby a source of torque external of the machine may be utilized.

2. A tool as in claim 1 wherein the first body portion includes an adjustable stop within the bore to assure that the specimen will bridge the interface between the two body portions.

3. A tool as in claim 1 wherein the main body portion includes a plunger movable axially of the bore to eject the specimen following the test.

4. A tool as in claim 1 wherein the means for retaining the second body portion in a position relative to the first body portion with the bores respective coaxial and the interfaces contiguous is a ring fixedly secured to the first body portion which captures the second body portion while allowing relative rotation therebetween.

5. A tool as in claim 4 wherein the retaining ring includes an adjustable stop and the second body portion includes a fixed ear adapted to interact with the fixed stop assuring that when the torque is removed, the sides of the bores will be returned to a position of alignment enabling the rapid insertion of another specimen for testing.

6. A tool as in claim 1 wherein the second body portion includes an outwardly extending lever arm which is interconnected to a pressure transfer arm whereby a controlled force may be applied by a testing mechanism.

7. A tool for testing the bond strength of a specimen of particle board or the like by placing the specimen in shear in a plane parallel to the face thereof by the application of torque to the specimen comprising; a first relatively fixed body portion having a specimen receiving bore therein and means to prevent rotational movement of the specimen, a second body portion having a bore of identical configuration as the bore in the first body portion and including means to prevent rotation of the specimen therein, said second body portion mounted for relative alignment of the bores, with the ends of the bores being contiguous, means for applying torque to the second body portion and means for measuring the torque necessary to cause destruction of the specimen.

8. A tool as in claim 7 wherein the first body portion includes an adjustable stop within the bore to assure that the specimen will bridge the interface between the two body portions.

9. A tool as in claim 7 wherein the main body portion includes a plunger movable axially of the bore to eject the specimen following the test.

* * * * *